United States Patent [19]

Pluss

[11] Patent Number: 4,532,086
[45] Date of Patent: Jul. 30, 1985

[54] PACKING MADE OF ONE-PIECE LAYERS

[75] Inventor: Raymond Pluss, Klein Andelfingen, Switzerland

[73] Assignee: Sulzer Brothers Limited, Winterthur, Switzerland

[21] Appl. No.: 397,435

[22] Filed: Jul. 12, 1982

[30] Foreign Application Priority Data

Jul. 30, 1981 [CH] Switzerland ............... 4923/81

[51] Int. Cl.³ ............... B01D 53/18; B01D 3/24; B01F 5/06; F28F 25/08
[52] U.S. Cl. ............... 261/94; 261/112; 261/DIG. 72; 428/116; 428/166
[58] Field of Search ............... 428/166, 178, 188, 116; 261/94–98, 111, 112, DIG. 72; 210/150

[56] References Cited

U.S. PATENT DOCUMENTS

| 1,561,044 | 11/1925 | Alexander | 261/113 |
| 3,168,432 | 2/1965 | Elfving | 428/116 |
| 3,574,103 | 4/1971 | Latkin | 428/116 X |
| 3,599,943 | 8/1971 | Munters | 261/DIG. 72 X |
| 3,698,440 | 10/1972 | Matthieu et al. | 428/188 X |
| 3,758,372 | 9/1973 | Fairbanks | 428/178 X |
| 3,785,620 | 1/1974 | Huber | 261/DIG. 72 X |
| 3,801,419 | 6/1974 | Meek | 428/184 X |
| 3,927,165 | 12/1975 | Grochol et al. | 261/DIG. 72 X |
| 4,107,241 | 8/1978 | Braun | 261/DIG. 72 X |
| 4,157,929 | 6/1979 | Kubicek | 428/185 X |

FOREIGN PATENT DOCUMENTS

| 0070915 | 2/1983 | European Pat. Off. | 261/DIG. 72 |
| 0070921 | 2/1983 | European Pat. Off. | 261/DIG. 72 |

Primary Examiner—George F. Lesmes
Assistant Examiner—Nancy A. B. Swisher
Attorney, Agent, or Firm—Kenyon & Kenyon

[57] ABSTRACT

The packing layers are constructed with parallel bridges between which a plurality of parallel angularly disposed deflecting surfaces are connected in bannister-fashion. The packing layers can be made from flat sheet metal bodies which can be punched and bent to form the various layers.

10 Claims, 19 Drawing Figures

PACKING MADE OF ONE-PIECE LAYERS

This invention relates to a packing made of one-piece layers and a process of making the packing.

Heretofore, various types of packings have been known for use in mass transfer, direct heat exchange and mixing. For example, various types of packings have been used in static mixers such as described in German A.S. No. 23 28 795 and 25 22 106. The function of the packings in these mixers is to provide a homogeneous mixing of two or more cocurrent flows, that is, to insure good mixing of the end product over the whole flow cross-section at all quantity and viscosity ratios of the components required to be mixed.

When used in mass transfer processes, the packings are flowed through in counter-current by the phases concerned in the mass transfer. In this case, the various surfaces of the packings serve as support surfaces for a liquid phase which trickles down as a film under gravity and with which, in the case of a gas-liquid process, for instance rectification, a gas phase filling up the various gaps in the packing in counter-current to the liquid phase is brought into surface contact or with which, in the case of extraction columns, a second liquid phase is brought into surface contact.

However, the various packings have been constructed in manners which are very expensive, particularly in view of the wide range of diameters required for such packings. For example, German A.S. No. 23 28 795 describes packings which are formed of comb-like plates which are pushed together in the shape of a cross. German A.S. No. 25 22 106 describes packings which consist of joined-together discrete elements in the form of "Spanish riders". In each case, the packings require special stamping tools for each diameter.

Accordingly, it is an object of the invention to provide a packing which is simple and inexpensive to produce for any required diameter.

It is another object of the invention to provide a packing element which can be made in a relatively simple manner for use in constructing a packing.

Briefly, the invention provides a packing which is comprised of a plurality of vertically disposed parallel layers. Each layer has a plurality of inclined parallel deflecting surfaces and at least one bridge at one end of the layer connecting the deflecting surfaces together. The deflecting surfaces of one layer are disposed in criss-crossing relation to the deflecting surfaces of the adjacent layer so as to define crossing flow channels.

In one embodiment, each layer of the packing is made from a flat one-piece body which can be stamped or punched. In this embodiment, the one-piece body which may be made of sheet metal or other like foil material is stamped or punched to form deflecting surfaces which can be bent out of the plane of the body with connecting bridges of material being left between the discrete deflecting surfaces. After bending of the deflecting surfaces from the plane of the body, the individual layers can be placed in contiguous relationship with one another so that the deflecting surfaces of the adjacent layers criss-cross. By placing layers of different lengths in side-by-side relationship, packings of any required cross-section can be provided.

In another embodiment, if the layer is made, for example, of plastics, each layer can be injection molded. Subsequently, such injected molded layers can be placed in contiguous relation to form a packing.

These and other objects and advantages of the invention will become more apparent from the following detailed description taken in conjunction with the accompanying drawings wherein.

Figure 1:
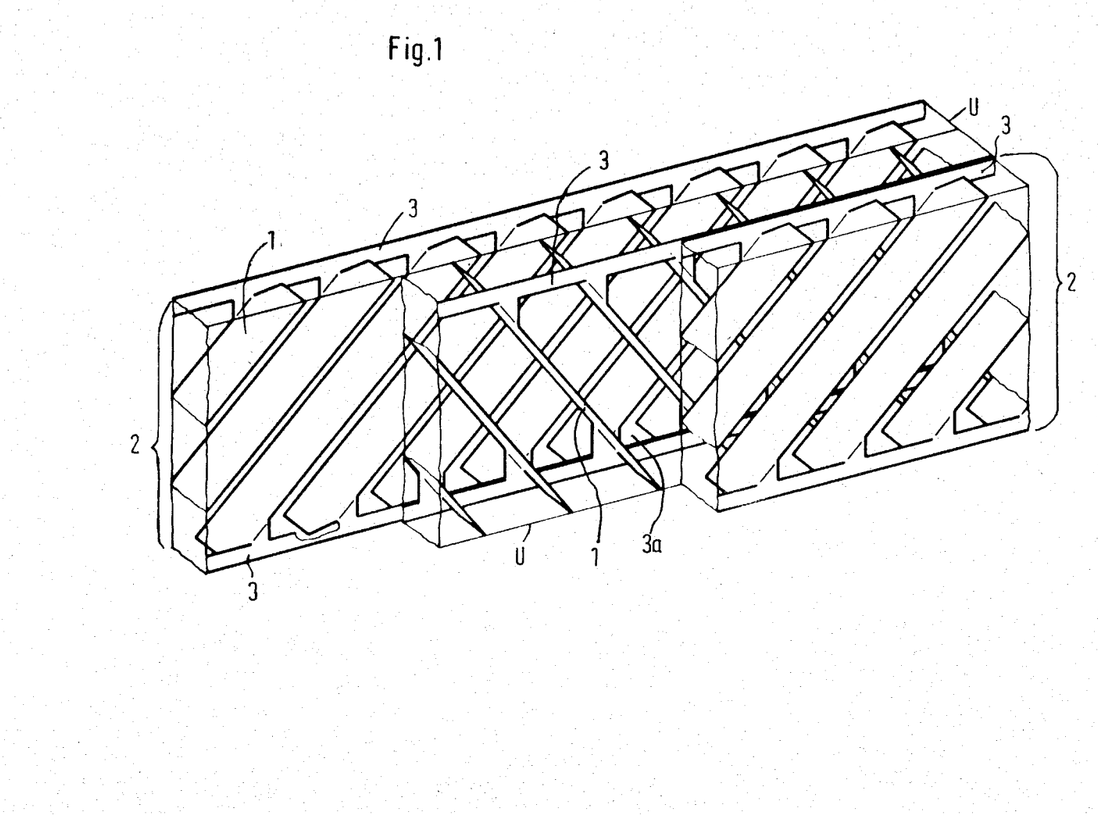
FIG. 1 illustrates a perspective view of three layers of a packing constructed in accordance with the invention.

Referring to FIG. 1, the packing is composed of a plurality of vertically disposed parallel layers 2. For example, only 3 of the layers 2 are shown for simplicity with the contours of the layers indicated by contour lines U. The packing can be used for any suitable purposes, for example in exchange columns, for example for mass exchange or for heat exchange purposes.

As shown in FIG. 1, each layer 2 has a plurality of inclined parallel deflecting surfaces 1 and a pair of bridges 3 at the top and bottom ends of each layer 2 which connect the deflecting surfaces 1 together. The deflecting surfaces 1 are inclined relative to a vertical axis, for example the axis of an exchange column. In addition, the deflecting surfaces 1 of each layer 2 are disposed in criss-crossing relation to the deflecting surfaces 1 of an adjacent continuous layer 2 to form criss-cross flow channels.

Figure 2:
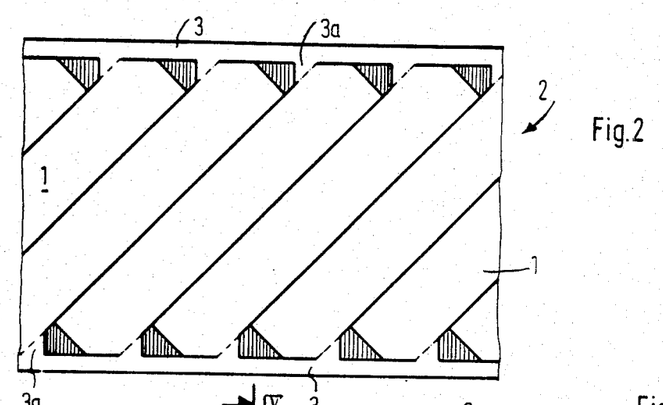
FIG. 2 illustrates a plan view of a one-piece body from which a packing layer can be fabricated in accordance with the invention.

Referring to FIG. 2, each layer 2 of the packing can be made from a flat one piece body, for example of foil like or sheet like material such as sheet metal. As indicated, such a body is stamped or punched so as to form parallel deflecting surfaces 1 which may or may not be perforated and/or roughened and/or fluted. In addition, bridges 3 are formed along the top and bottom of the sheet metal body with the surfaces 1 connected at opposite ends to the respective bridges 3 in banister-fashion via triangular connecting pieces 3a. As indicated, the deflecting surfaces 1 extend between the bridges 3 and are connected at the diagonally opposite corners to the bridges 3. In addition, the tips of the surfaces 1 are severed during punching in order not to project from the plane of the body after a bending operation. The resultant gaps or spaces which arise at this time are shown in hatched lines.

Figure 3:
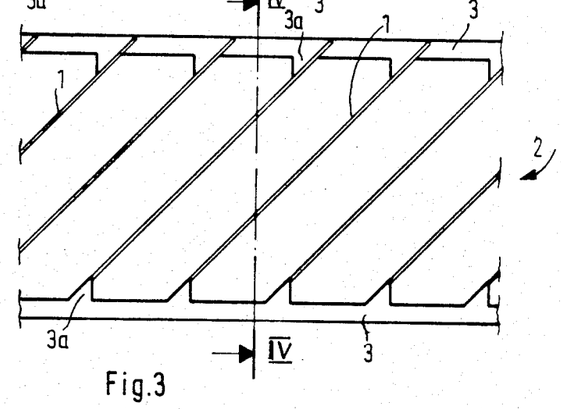
FIG. 3 illustrates a view of the body of FIG. 2 with deflecting surfaces bent out of the plane of the body.
Figure 4:
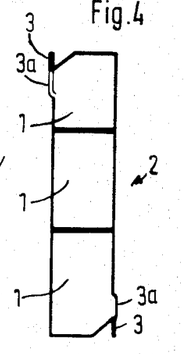
FIG. 4 illustrates a view taken on line IV—IV of FIG. 3.

Referring to FIGS. 3 and 4, after punching, the deflecting surfaces 1 are bent relative to the two bridges 3 out of the plane of the body. As indicated in FIG. 4, the bridges are also displaced into separate parallel planes.

After punching and bending, the various layers 2 are placed in contiguous relation with each other so that the deflecting surfaces 1 of adjacent layers criss-cross one another. Thereafter, the contacting bridges 3 are secured to each other, for example by spot welding.

Figure 5:
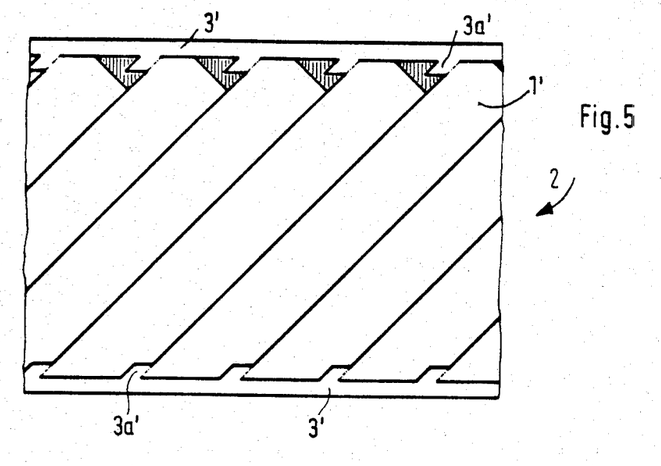
FIG. 5 illustrates a plan view of a stamped body for forming a modified packing layer in accordance with the invention.
Figure 6:
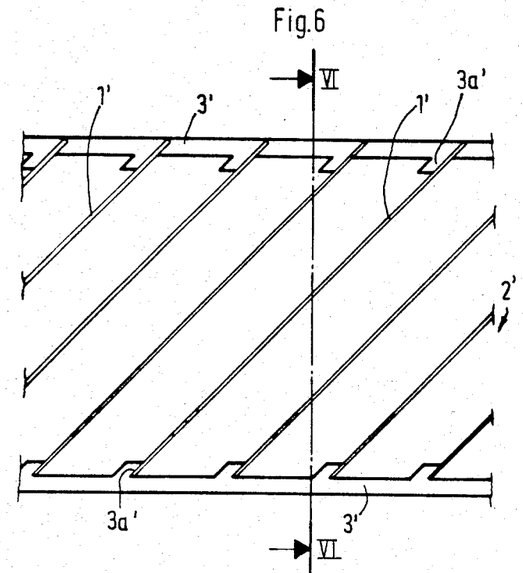
FIG. 6 illustrates a view of the body of FIG. 5 with deflecting surfaces bent outwardly.
Figure 7:
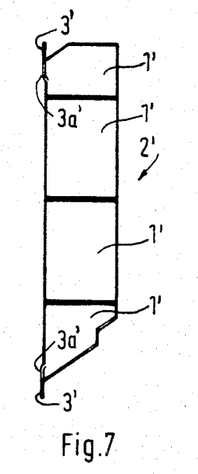
FIG. 7 illustrates a view taken on line VI—VI of FIG. 6.

Referring to FIGS. 5 to 7, wherein primed reference characters indicate like parts as above, the one-piece body may be stamped so that the deflecting surfaces 1' are connected to the two bridges 3' at opposite ends and along the same edge via connecting pieces 3a'.

As indicated in FIG. 5, the tips of the deflecting surfaces 1' are severed at only one end, as indicated by cross-hatching. Further, as indicated in FIG. 6, the deflecting surfaces 1 are bent out of the plane of both bridges 3' so that the bridges 3' remain in co-planar relation as indicated in FIG. 7.

Figure 8:
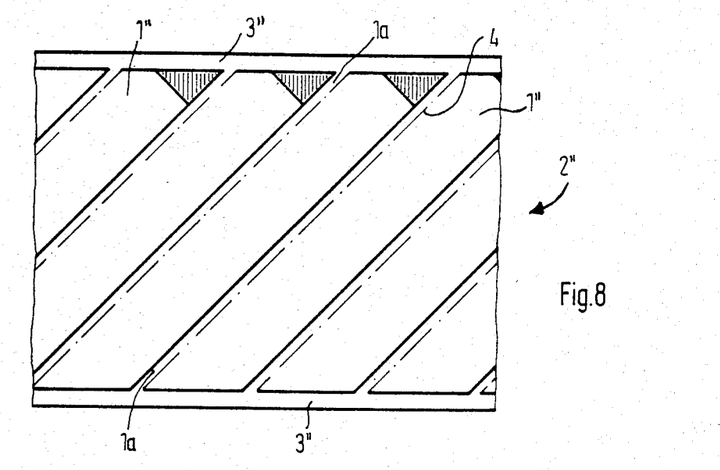
FIG. 8 illustrates a plan view of a further modified one-piece body for forming a packing layer in accordance with the invention.
Figures 9, 10:
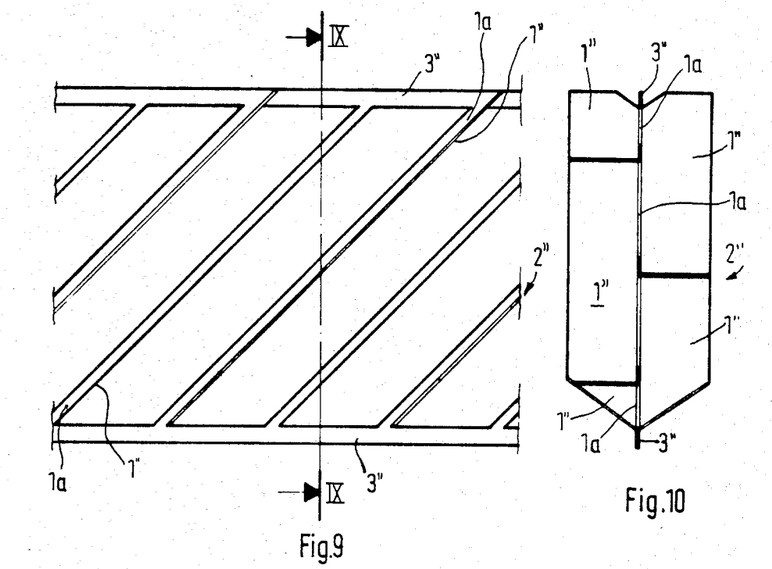
FIG. 9 illustrates a view of the body of FIG. 8 with deflecting surfaces bent outwardly.
FIG. 10 illustrates a view taken on line IX—IX of FIG. 9.

Referring to FIGS. 8 to 10, wherein double primed reference characters indicate like parts as above, a one-piece body of sheet metal may be punched so as to form not only deflecting surfaces 1" but also a plurality of parallel strips 1a which are angularly disposed between the bridges 3'. As indicated, each deflecting surface 1 is connected along one edge with a respective strip 1a.

As indicated in FIGS. 9 and 10, the deflecting surfaces 1" may be bent out of the plane of the sheet metal body in alternating fashion. In this way, the bridges 3" and strips 1a are centrally located between two series of deflecting surfaces 1'".

Of note, FIG. 8 illustrates bending lines 4 about which the deflecting surfaces 1" are bent relative to the strips 1a.

Figure 11:
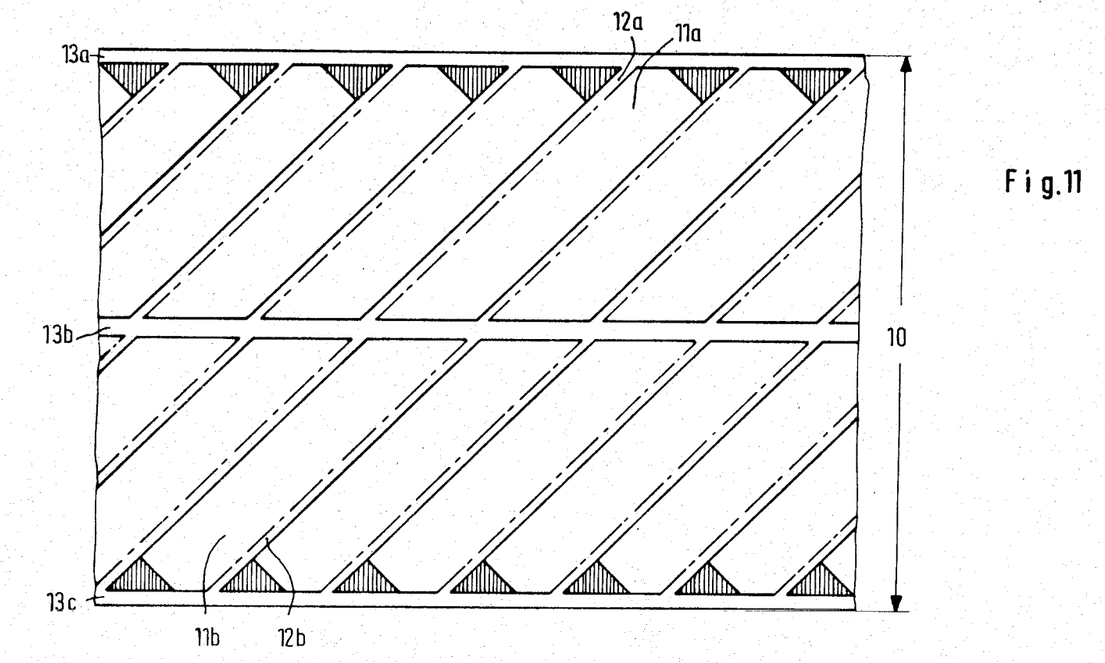
FIG. 11 illustrates a plan view of a further modified one-piece body for forming a packing layer in accordance with the invention.
Figure 12:
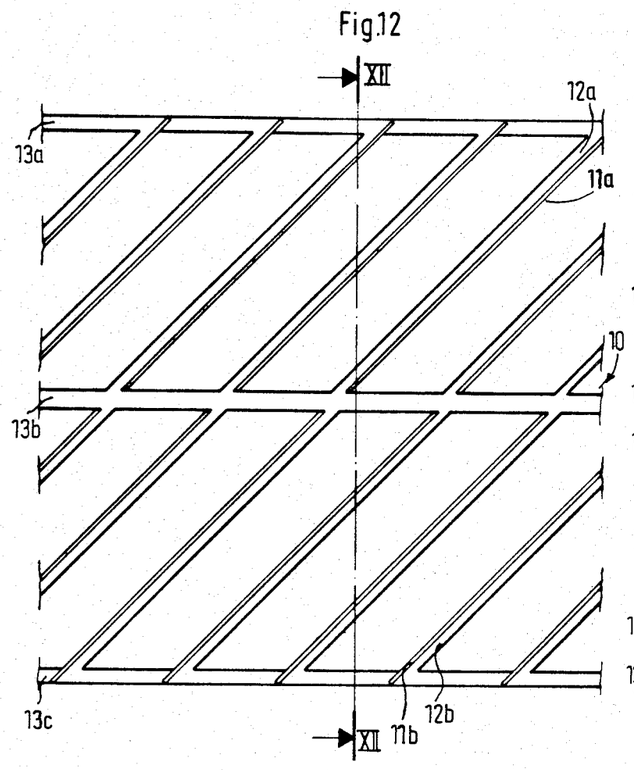
FIG. 12 illustrates a view of the body of FIG. 11 with deflecting surfaces bent outwardly.
Figure 13:
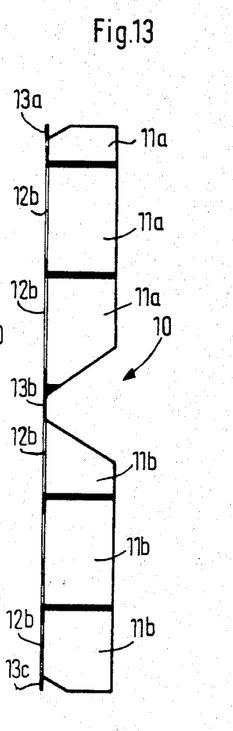
FIG. 13 illustrates a view taken on line XII—XII of FIG. 12.

Referring to FIGS. 11 to 13, a flat one-piece body may be formed with three bridges 13a, 13b, 13c with each deflecting surface having a pair of sections 11a, 11b disposed about the central bridge 13b. As indicated, the body is formed with a plurality of parallel strips which are formed with sections 12a, 12b to connect each deflecting surface section 11a, 11b between two of the bridges 13a, 13b, 13c.

As indicated in FIGS. 12 and 13, the deflecting surface sections 11a, 11b are bent out of the plane of the body so that the bridges 13a, 13b, 13c are coplanar.

Figure 14:
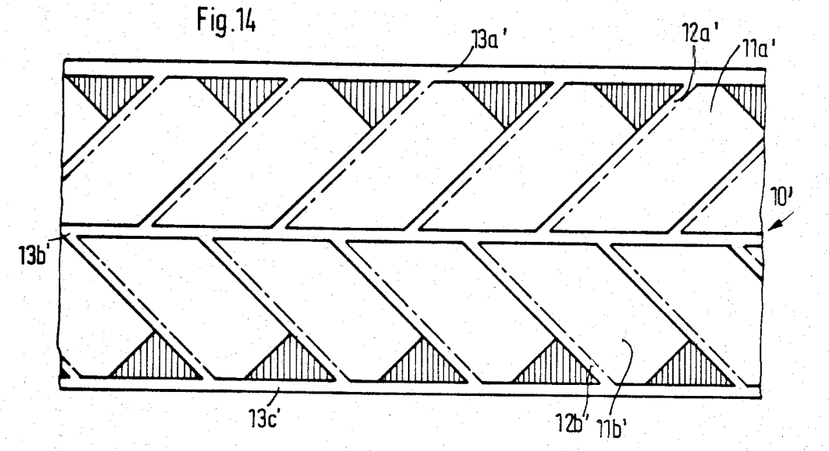
FIG. 14 illustrates a view similar to FIG. 11 of a further modified body for forming a packing layer in accordance with the invention.
Figures 15, 16:
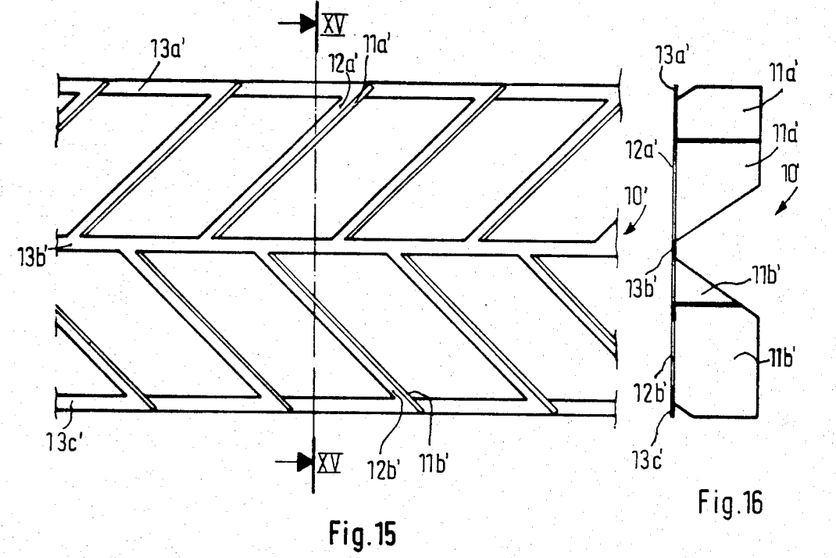
FIG. 15 illustrates a view of the body of FIG. 14 with the deflecting surfaces bent outwardly.
FIG. 16 illustrates a view taken on line XV—XV of FIG. 15.

Referring to FIGS. 14 to 16, wherein primed reference characters indicate like parts as in FIGS. 11 to 13, a one-piece body 10' may have the deflecting surface sections 11a', 11b' angularly disposed relative to each other. When bent into the condition indicated in FIGS. 15 and 16, the various deflecting surface sections 11a', 11b' define rows of angularly disposed deflecting surfaces which are vertically offset with respect to each other.

Figure 17:
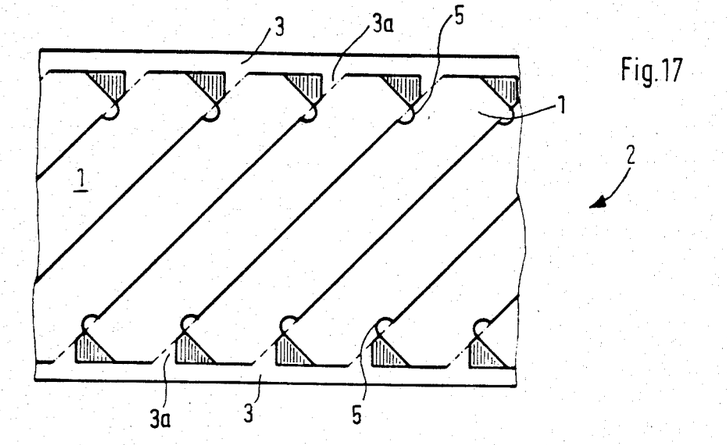
FIG. 17 illustrates a plan view of a further modified body for forming a packing layer in accordance with the invention.
Figure 18:
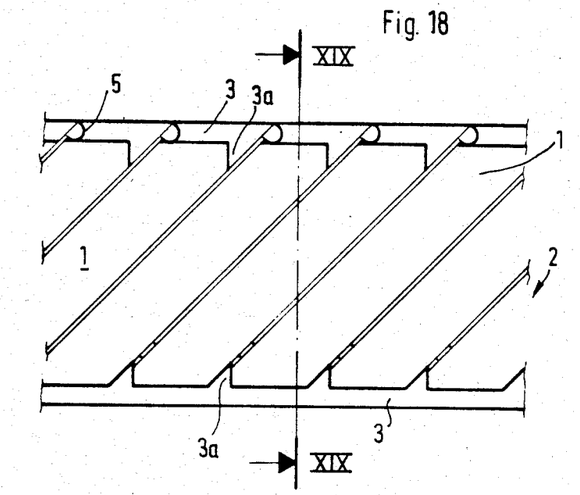
FIG. 18 illustrates a view of the body of FIG. 17 with deflecting surfaces bent outwardly.
Figure 19:
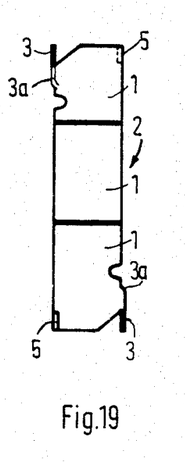
FIG. 19 illustrates a view taken on line XIX—XIX of FIG. 18.

Referring to FIGS. 17 to 19, wherein like reference characters indicate like parts as in FIGS. 2 to 4, each deflecting surface 1 may be formed with a bendable connecting lug 5 along at least one edge. These lugs 5 may be punched out from the adjacent deflecting surfaces during forming. As indicated in FIGS. 18 and 19, the lugs 5 are bent so as to be parallel to the bridges 3 so as to provide an additional connection point between the adjacent layers 2.

In the various embodiments described above, the deflecting surfaces may also be provided with jagged edges on the narrow sides and/or the connecting bridges may have jagged free edges to aid in insuring a uniform discharge of a descending liquid phase on the packing.

In order to form a layer for a multi-layer packing, a flat sheet like body of any one of the above described embodiments is first formed so as to have at least two parallel spaced apart bridges and a plurality of bendable parallel deflecting surfaces angularly disposed between the bridges. Thereafter, the deflecting surfaces are bent out of the plane of the bridges for instance by 90°. In the embodiment where the deflecting surfaces are formed with the bendable lugs, each lug is bent relative to the deflecting surface into parallel relation with the bridges.

Alternatively, the packing layers can be injection molded. In this case, the layers can be made, for example of plastics.

The layers may be continously formed from a relative long strip of flat material and cut to the appropriate length for forming for instance a packing of cylindrical shape.

Further, a packing body for a column may also be formed by arranging the layers such, that their bridges come into a position parallel to the axis of the column.

The invention thus provides a packing which is composed of layers which form criss-crossing flow channels while being laterally open from one layer to the next. The packing can be used, for example in exchange processes such as for mass exchange and direct heat exchange and mixing purposes.

What is claimed is:

1. A packing for mass transfer, direct heat exchange or mixing comprising a plurality of vertically disposed parallel layers, each said layer having a plurality of inclined parallel deflecting surfaces and at least one bridge at one end of a layer connecting said deflecting surfaces of said respective layer together, said deflecting surfaces of one layer being disposed in criss-crossing relation to said deflecting surfaces of an adjacent layer to form criss-cross flow channels disposed in laterally open relationship from one layer to another.

2. A packing as set forth in claim 1 wherein each layer has a bridge at each of two opposite ends connecting said deflecting surfaces thereof together, each said deflecting element being connected to said respective bridges at diagonally disposed corners thereof.

3. A packing as set forth in claim 1 wherein each layer has a bridge at each of two opposite ends connecting said deflecting surfaces thereof together, each said deflecting element being connected to said respective bridges at opposite ends of a longitudinal side thereof.

4. A packing as set forth in claim 1 wherein each deflecting surface includes at least two spaced apart sections, and which comprises at least three bridges with each deflecting surface section being connected at opposite ends to two of said bridges.

5. A packing as set forth in claim 4 wherein said sections of each deflecting element are disposed in angular relation of each other.

6. A packing as set forth in claim 1 wherein at least one side of each deflecting surface and/or said bridge is jagged on an outer edge thereof.

7. A packing as set forth in claim 1 wherein said bridges of adjacent layers are interconnected to each other.

8. A packing as set forth in claim 1 wherein said deflecting surfaces of each layer extend from opposite sides of said bridge.

9. A packing as set forth in claim 1 wherein two neighboring deflecting surfaces of said layers extend from opposite sides of said bridges and are coplanar.

10. A packing as set forth in claim 1 wherein each layer has a plurality of parallel strips extending from said bridge in co-planar relation with each deflecting surface extending outwardly of a respective strip.

* * * * *